United States Patent
Rutledge

(10) Patent No.: US 11,655,754 B2
(45) Date of Patent: May 23, 2023

(54) MULTI-PURPOSE DRIVE FOR INTERNAL COMBUSTION ENGINE

(71) Applicant: Perkins Engines Company Limited, Peterborough (GB)

(72) Inventor: John Rutledge, Peterborough (GB)

(73) Assignee: Perkins Engines Comapny Limited, Peterbourough (GB)

( * ) Notice: Subject to any disclaimer, the term of this patent is extended or adjusted under 35 U.S.C. 154(b) by 22 days.

(21) Appl. No.: 17/299,455

(22) PCT Filed: Nov. 27, 2019

(86) PCT No.: PCT/EP2019/025421
§ 371 (c)(1),
(2) Date: Jun. 3, 2021

(87) PCT Pub. No.: WO2020/114625
PCT Pub. Date: Jun. 11, 2020

(65) Prior Publication Data
US 2022/0056839 A1     Feb. 24, 2022

(30) Foreign Application Priority Data
Dec. 3, 2018    (GB) ..................................... 1819699

(51) Int. Cl.
*F02B 39/04*    (2006.01)
*F02B 33/40*    (2006.01)
*F02B 39/12*    (2006.01)

(52) U.S. Cl.
CPC .............. *F02B 39/04* (2013.01); *F02B 33/40* (2013.01); *F02B 39/12* (2013.01)

(58) Field of Classification Search
CPC .......... F02B 33/32; F02B 33/34; F02B 33/36; F02B 33/38; F02B 33/40; F02B 37/04;
(Continued)

(56) References Cited

U.S. PATENT DOCUMENTS

| 4,145,888 A | 3/1979 | Roberts |
| 5,133,188 A * | 7/1992 | Okada ..................... F02B 37/04 |
| | | 123/561 |

(Continued)

FOREIGN PATENT DOCUMENTS

| CN | 1963166 A | 5/2007 |
| DE | 10061970 A1 | 6/2002 |

(Continued)

OTHER PUBLICATIONS

International Search Report related to Application No. PCT/EP2019/025421; dated Mar. 23, 2020.
(Continued)

*Primary Examiner* — Loren C Edwards
(74) *Attorney, Agent, or Firm* — von Briesen & Roper, s.c.

(57) ABSTRACT

An engine assembly comprises: an internal combustion engine having: a combustion chamber; an air inlet for supplying air to the combustion chamber; a fuel injector for supplying fuel to the combustion chamber; an exhaust outlet for releasing exhaust gas from the combustion chamber and a rotatable drive shaft, wherein combustion of fuel in air within the combustion chamber results in rotation of the drive shaft. The engine assembly further comprises: a turbocharger system comprising: a turbine configured to recover energy from exhaust gas provided via the exhaust gas outlet; and a turbocharger compressor configured to receive energy from the turbine and thereby to compress air for use in combustion of fuel in the combustion chamber. The engine assembly further comprises: a supercharger system comprising a supercharger compressor configured to receive kinetic energy from the drive shaft and to compress air for use in combustion in the combustion chamber. The engine assembly further comprises: a flywheel configured for kinetic energy storage; a first linkage between the drive (Continued)

shaft and the flywheel, wherein the linkage comprises a variable belt drive; and a second linkage between the first linkage and the supercharger compressor.

18 Claims, 7 Drawing Sheets

(58) Field of Classification Search
CPC ........ F02B 37/10; F02B 37/105; F02B 37/11; F02B 39/02; F02B 39/04; F02B 39/12
See application file for complete search history.

(56) References Cited

U.S. PATENT DOCUMENTS

| | | | |
|---|---|---|---|
| 5,724,949 A | 3/1998 | Liang | |
| 5,819,538 A | 10/1998 | Lawson, Jr. | |
| 5,890,468 A * | 4/1999 | Ozawa | F02B 39/16 |
| | | | 123/561 |
| 6,994,603 B2 | 2/2006 | Clark et al. | |
| 8,196,686 B2 | 6/2012 | Grieve | |
| 8,495,877 B2 | 7/2013 | Weyer et al. | |
| 2011/0100339 A1* | 5/2011 | Weyer | F02B 37/105 |
| | | | 123/563 |
| 2013/0042617 A1 | 2/2013 | Atkins et al. | |
| 2017/0002729 A1* | 1/2017 | Burtt | F04D 25/163 |

FOREIGN PATENT DOCUMENTS

| | | |
|---|---|---|
| GB | 2237339 B | 5/1991 |
| GB | 2317647 A | 4/1998 |
| GB | 2400410 A | 10/2004 |
| WO | 2005119027 A1 | 12/2005 |

OTHER PUBLICATIONS

Great Britian Search Report related to Application No. GB1819699. 8; dated May 31, 2019.

* cited by examiner

MULTI-PURPOSE DRIVE FOR INTERNAL COMBUSTION ENGINE

CROSS REFERENCE TO RELATED APPLICATION

This Application is a 35 USC § 371 US National Stage filing of International Application No. PCT/EP2019/025421 filed on Nov. 27, 2019 which claims priority under the Paris Convention to Great Britain Patent Application No. 1819699,8 filed on Dec. 3, 2018.

TECHNICAL FIELD

The disclosure relates to the field of internal combustion engines and, in particular, to internal combustion engines making use of a high speed flywheel for energy storage.

BACKGROUND

Increasing engine efficiency and performance characteristics is a desire of engine manufacturers and users alike.

In some applications, an engine may be specified with the expectation that the full capability of the engine may be used only rarely. Where that is the case, it follows that the engine is over-specified for the vast majority of tasks. Nevertheless, though only used rarely, the full capability of the engine may necessitate more sophisticated exhaust aftertreatment solutions involving additional cost, complexity and space requirements.

It is has become more common in recent years to specify a lower capacity engine that is capable of delivering capacity to meet the requirements of almost all expected tasks, and then to provide supplementary power to accommodate the relatively rare circumstances when the engine capacity is not sufficient for a particular task. Such supplementary power may be provided by, for example, an electric motor. Where present, an electric motor may provide power to a compressor of a turbocharger in use with the engine (known as electric turbo assist). Alternatively, a motor may supply power to a compressor of a supercharger in use with the engine. Alternatively, an electric motor may provide power to the engine crank (known as electrical hybrid). Disadvantages associated with solutions involving an electric motor may be cost of the motor, cost and complexity of associated power electronics and cost and volume of an associated electrical storage function (e.g. battery).

SUMMARY OF THE DISCLOSURE

Against this background there is provided: an engine assembly comprising:
  an internal combustion engine having: a combustion chamber; an air inlet for supplying air to the combustion chamber; a fuel injector for supplying fuel to the combustion chamber; an exhaust outlet for releasing exhaust gas from the combustion chamber and a rotatable drive shaft, wherein combustion of fuel in air within the combustion chamber results in rotation of the drive shaft;
  a turbocharger system comprising: a turbine configured to recover energy from exhaust gas provided via the exhaust gas outlet; and a turbocharger compressor configured to receive energy from the turbine and thereby to compress air for use in combustion of fuel in the combustion chamber;
  a supercharger system comprising a supercharger compressor configured to receive kinetic energy from the drive shaft and to compress air for use in combustion in the combustion chamber;
  a flywheel configured for kinetic energy storage;
  a first linkage between the drive shaft and the flywheel, wherein the linkage comprises a variable belt drive; and
  a second linkage between the first linkage and the supercharger compressor.

In a further aspect, there is disclosed a method of controlling an engine assembly, the engine assembly comprising:
  an internal combustion engine having: a combustion chamber; an air inlet for supplying air to the combustion chamber; a fuel injector for supplying fuel to the combustion chamber; an exhaust outlet for releasing exhaust gas from the combustion chamber and a rotatable drive shaft, wherein combustion of fuel in air within the combustion chamber results in rotation of the drive shaft;
  a turbocharger system comprising: a turbine configured to recover energy from exhaust gas provided via the exhaust gas outlet; and a turbocharger compressor configured to receive energy from the turbine and thereby to compress air for use in combustion of fuel in the combustion chamber;
  a supercharger system comprising a supercharger compressor configured to receive kinetic energy from the drive shaft and to compress air for use in combustion in the combustion chamber;
  a flywheel configured for kinetic energy storage;
  a first linkage between the drive shaft and the flywheel, wherein the linkage comprises a variable belt drive; and
  a second linkage between the first linkage and the supercharger compressor;
  the method comprising:
  in an energy storage mode, transferring energy via the first linkage to the flywheel for storage of energy on the flywheel; and
  in an energy release mode, transferring energy from the flywheel to either or both of:
  (a) the drive shaft via the first linkage; and
  (b) the supercharger system via the second linkage.

DETAILED DESCRIPTION

Figure 1:
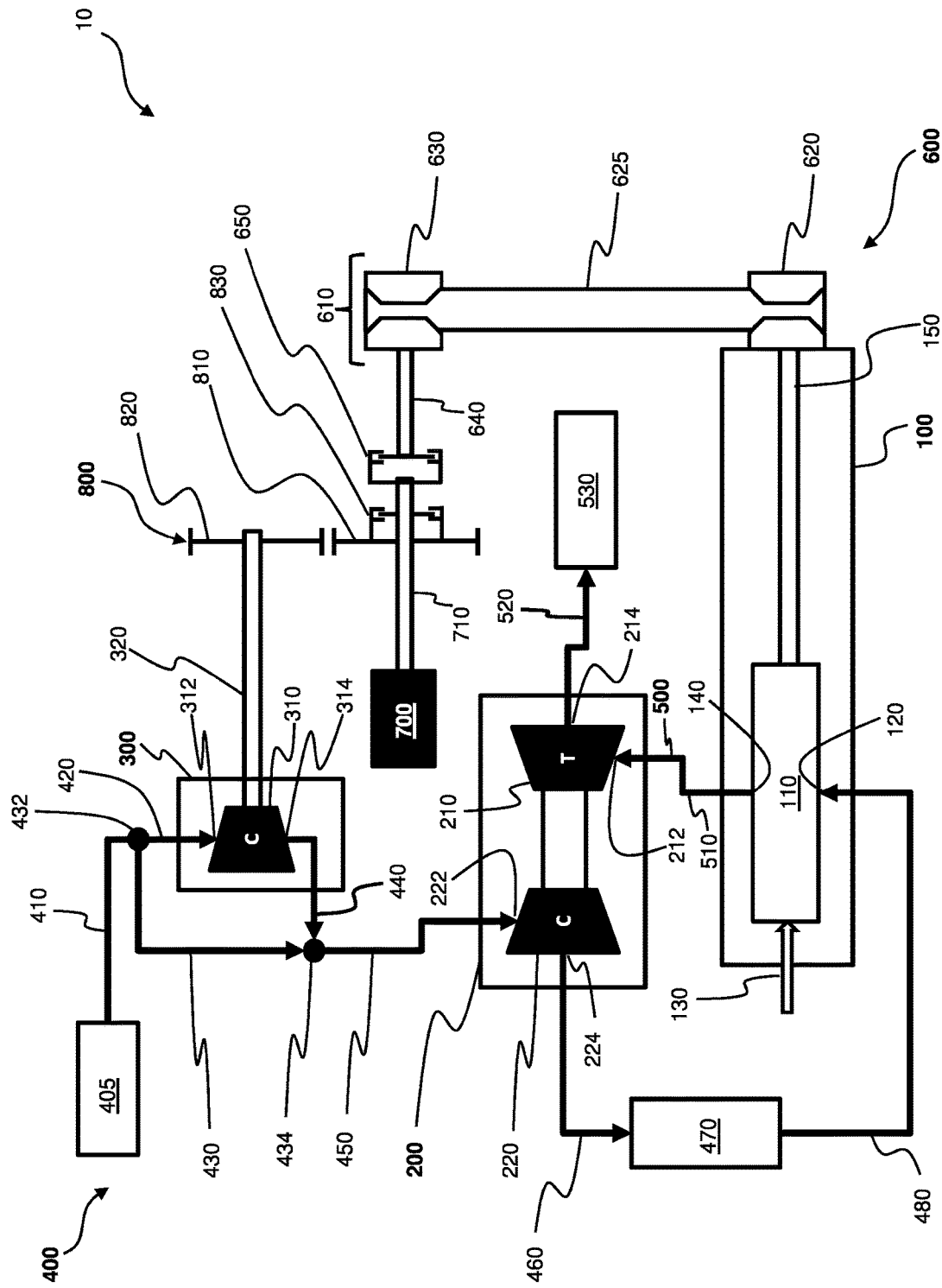
FIG. 1 shows a schematic diagram of an engine assembly in accordance with an embodiment of the disclosure that includes a variable belt drive assembly.

The schematic diagram of an engine assembly in accordance with an embodiment of the disclosure is shown in FIG. 1.

The engine assembly 10 comprises an internal combustion engine 100, a turbocharger system 200, a supercharger system 300, an air supply circuit 400, an exhaust circuit 500, a first linkage 600, a flywheel 700 and a second linkage 800.

The internal combustion engine 100 may comprise a combustion chamber 110, an air inlet 120 for supplying air to the combustion chamber, a fuel injector 130 for injecting fuel into the combustion chamber, an exhaust outlet 140 for releasing exhaust gas from the combustion chamber and a rotatable drive shaft 150. As is well known in the art, combustion of fuel in air within the combustion chamber 110 results in rotation of the drive shaft 150. The combustion chamber 110 may comprise one or more pistons (not shown) each of which may be associated with one or more fuel injectors 130 and each of which may have one or more air inlets 120 and one or more exhaust outlets 140. Again, the specific configuration of combustion chamber air inlets 120, exhaust outlets 130 and fuel injectors 140 may be as known in the art.

The turbocharger system 200 comprises a turbine 210 and a turbocharger compressor 220. The turbine 210 comprises a turbine inlet 212 by which gas may enter the turbine 210 and a turbine outlet 214 by which gas may exit the turbine 210. Gas passing through the turbine 210 between the turbine inlet 212 and the turbine outlet 214 may cause the turbine 210 to rotate. A mechanical connection between the turbine 210 and the turbocharger compressor 220 enables rotational kinetic energy in the turbine 210 to be transferred to the turbocharger compressor 220 in order to compress gas in the turbocharger compressor 220. The turbocharger compressor 220 may comprise a turbocharger compressor inlet 222 and a turbocharger compressor outlet 224. Gas passing in through the turbocharger compressor inlet 222 may be compressed by the turbocharger compressor 220 and the compressed gas may exit via the turbocharger compressor outlet 224.

In this way, in operation, the turbocharger system 200 may be used to recover energy from exhaust gas released by the internal combustion engine 100 and use that energy to compress air upstream of the internal combustion engine 100 in order to enable more fuel to be burned given the increased amount of air available by virtue of the compression. In this way, engine output may be increased.

The supercharger system 300 comprises a supercharger compressor 310 having a supercharger compressor inlet 312 and a supercharger compressor outlet 314. The supercharger compressor 310 further comprises a supercharger shaft 320 configured to receive rotational kinetic energy and transfer it to the supercharger compressor 310 in order to compress gas in the supercharger compressor 310.

In this way, in operation, the supercharger system 300 may use energy recovered from the drive shaft 150 of the internal combustion engine 100 (in the manner and using the features described below) in order to compress air upstream of the internal combustion engine 100 (indeed, upstream of the turbocharger system 200) in order to enable more fuel to be burned given the increased amount of air available by virtue of the compression. In this way, engine output may be increased.

The air supply circuit 400 comprises an air cleaner 405 configured to receive air, for example from atmosphere. The air cleaner 405 may comprise one or more filters or any other features for cleaning air as it enters the engine assembly 10.

The air supply circuit 400 may further comprise a first conduit 410 that transfers air from an outlet of the air cleaner 410 to a splitter 432, Downstream of the splitter 432 the air supply circuit 400 may comprise (a) a supercharger inlet conduit 420 terminating at the supercharger compressor inlet 312 for supplying air to the supercharger compressor 310 and (b) a bypass conduit 430 for bypassing the supercharger system 300. The air supply circuit 400 may further comprise a supercharger outlet conduit 440 beginning at the supercharger compressor outlet 314 and terminating at a joiner 434 which connects with a downstream end of the bypass conduit 430.

In this way, there are two parallel routes for air between the splitter 432 and the joiner 434. A first option is for air to pass through the supercharger compressor 310 and a second option is for the air to pass through the bypass conduit 430. The splitter 432 may alternatively be labelled a bifurcation point 432 and the joiner 434 may alternatively be labelled a merging point 434.

A valve (not shown) may control flow of air in the bypass channel 430 and the supercharger 300. The valve may be located as appropriate to achieve the function of controlling whether air passes through the supercharger 300 or through the bypass channel 430.

The air supply circuit 400 may further comprise a turbocharger compressor inlet conduit 450 may connect the joiner 434 with the turbocharger compressor inlet 222. A turbocharger compressor outlet conduit 460 may connect the turbocharger compressor outlet 224 with an inlet of an air-to-air heat transfer device 470. A further conduit 480 may then connect an outlet of the air-to-air heat transfer device 470 to the air inlet 120 of the internal combustion engine 100.

Accordingly, the air supply circuit 400 may supply air from the air cleaner 405 to the supercharger system 300 (assuming it is not bypassed) and on to the turbocharger system 200 before providing the air, duly compressed, to the air inlet 120 of the internal combustion engine 100. Alternatively, if the supercharger system 300 is bypassed using the bypass conduit 430, the air supply circuit 400 may supply air from the air cleaner 405 to the turbocharger system 200 before providing the air, duly compressed, to the air inlet 120 of the internal combustion engine 100.

In alternative embodiments, not illustrated, the turbocharger system 200 may comprise a plurality of turbochargers, each comprising a compressor and a turbine, and may be configured such that air flows through the compressor of each turbocharger in turn.

Similarly, in another alternative embodiment, not illustrated, the supercharger system 300 may comprise a plurality of superchargers, each comprising a compressor, and may be configured such that air flows through the compressor of each supercharger in turn.

The exhaust system 500 may comprise a first conduit 510 to feed exhaust gas from the exhaust outlet 140 of the internal combustion engine 100 to an inlet 212 of the turbine 210 of the turbocharger system 200. The exhaust circuit 500 may further comprise a second conduit 520 configured to direct exhaust gas from the turbine outlet 214 to an inlet of an aftertreatment apparatus 530. The aftertreatment apparatus 530 may be one of a wide range of aftertreatment apparatus options as are well known in the art.

The exhaust system 500 and inlet system and air supply circuit 400 may, in some embodiments, be interconnected by an exhaust gas recirculation (EGR) system which may be used to control engine exhaust emissions. For the sake of clarity the illustrated embodiments do not show an EGR system.

A first linkage 600 provides a mechanical connection between the drive shaft 150 of the internal combustion engine 100 and the flywheel 700 configured for kinetic energy storage.

The first linkage 600 comprises a variable belt drive system 610 that transfers rotation of kinetic energy between a first end 620 and a second end 630 via a belt 625. The variable belt drive system 610 may be of a conventional arrangement whereby axial movement of the first and second end 620 630 results in a change in diameter of the first and second end 620 630 which changes the gearing ratio between of the first and second ends 620, 630 of the variable drive belt system 610. In this way, energy may be transferred from the drive shaft 150 of the internal combustion engine 100 to a rotating output shaft 640 of the first linkage 600 and the rate of rotation of the secondary rotating shaft 640 can be different from and variable with respect to the rate of rotation of the drive shaft 150 of the internal combustion engine 100.

The flywheel 700 may be a high speed flywheel specifically configured for kinetic energy storage. The flywheel 700 may comprise a flywheel shaft 710 by which rotational energy is transferrable into and out of the flywheel 700. The flywheel shaft 710 may be connected to the rotating output shaft 640 of the first linkage 600 via a first clutch 650. In this way, by closing the first clutch 650, rotational energy in the rotating output shaft 640 of the first linkage 600 may be transferred to the flywheel shaft 710 or rotational energy in the flywheel shaft 710 may be transferred to the rotating output shaft 640. By contrast, by opening the first 650 clutch, no kinetic rotational energy may transfer between the rotating output shaft 640 flywheel shaft 710 in either direction.

A fixed ratio transmission may be provided between the first linkage output shaft 640 and the flywheel input shaft 710 to allow the flywheel 700 to operate at a multiple of the speed of the first linkage output shaft 640. This fixed ratio transmission may either be between the first clutch 650 and the first linkage output shaft 640 or between the first clutch 650 and the flywheel input shaft 710.

The second linkage 800 provides a mechanical connection between the flywheel 700 and the supercharger system 300.

Specifically, the second linkage 800 may comprise a supercharger linkage 810, 820 configured to transfer rotational kinetic energy from the flywheel shaft 710 to the supercharger shaft 320 via a second clutch 830.

In this way, by closing the second clutch 830, rotational energy in the flywheel shaft 710 may be transferred to the second linkage 800. By contrast, by opening the second clutch 830, no kinetic rotational energy may transfer between the flywheel shaft 710 and the supercharger shaft 320 in either direction.

It may be envisaged that the engine assembly 10 is operated in a manner such that the second clutch 830 is closed only in circumstances when there will be a transfer of rotational kinetic energy in one direction, namely between the flywheel shaft 710 and the supercharger 300, and not in the other direction, namely between the supercharger 300 and the flywheel shaft 710.

In some embodiments, the second linkage 800 may comprise first and second gear elements 810, 820 to facilitate a change in rate of rotation between the flywheel shaft 710 and the supercharger shaft 320.

The skilled person appreciates that the engine assembly 10 shown schematically in FIG. 1 and described above is not the only embodiment of engine assembly possible in accordance with the claimed invention. Alternatives to the illustrated engine assembly 10 are possible and envisaged without departing from the scope of the claims.

In just one of many alternative examples, the engine assembly 10 may comprise an EGR system as described above.

Figure 2:
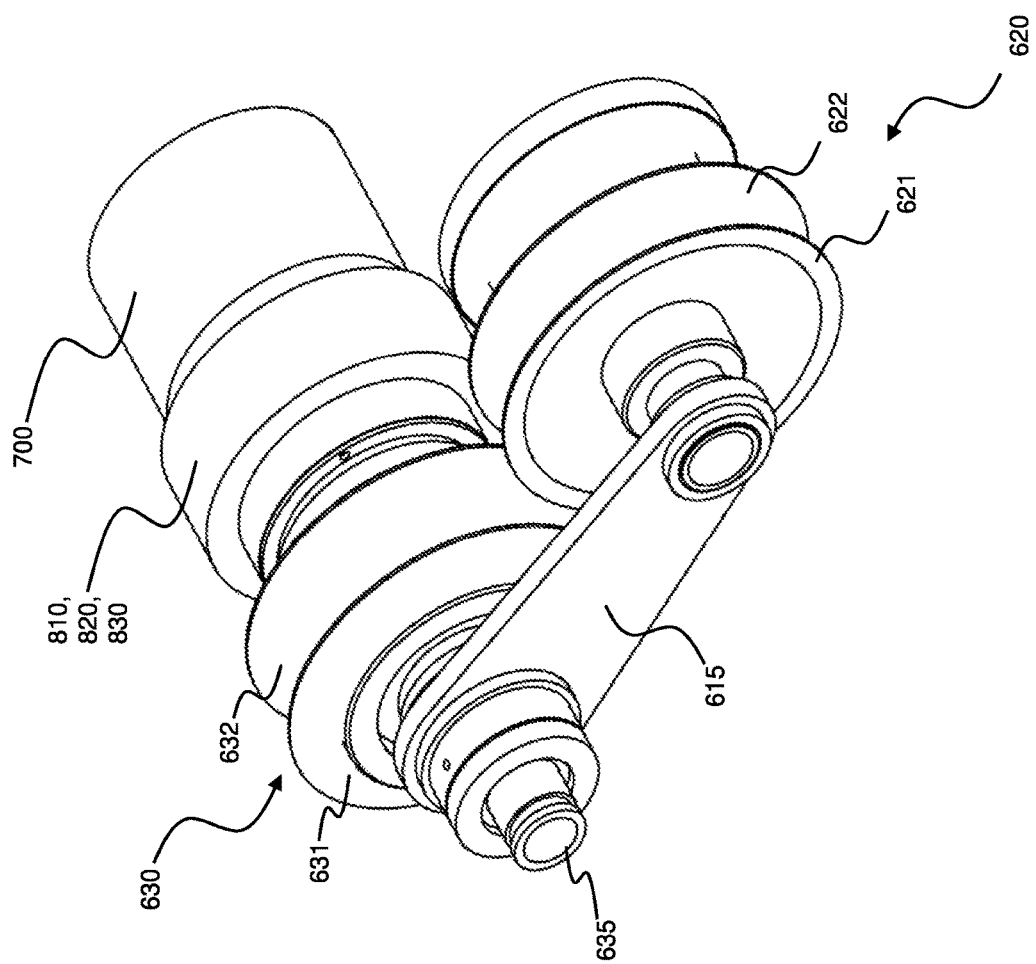
FIG. 2 shows a simplified perspective view of an embodiment of the variable belt drive assembly of FIG. 1.
Figure 3:
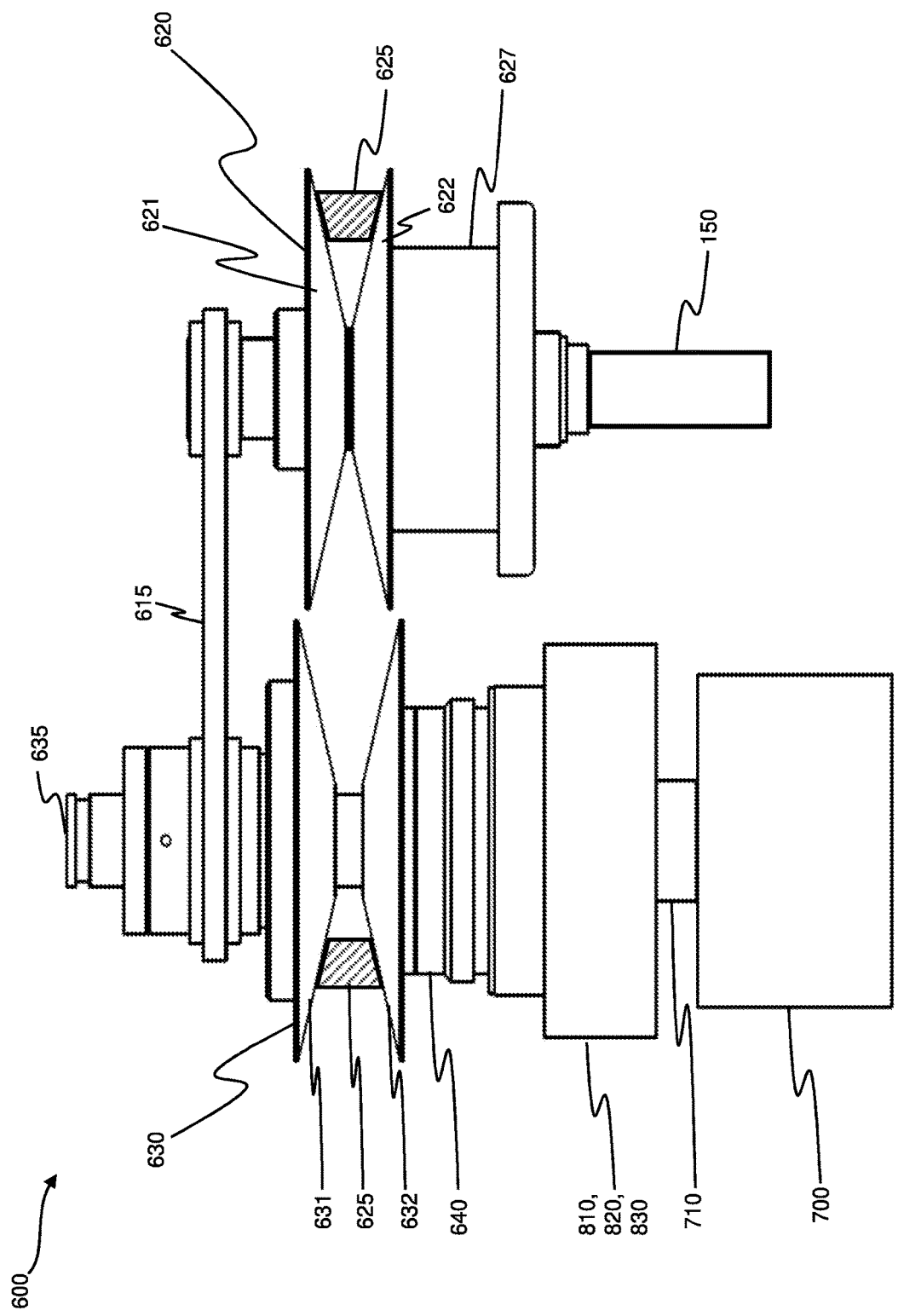
FIG. 3 shows a two-dimensional representation of the arrangement of FIG. 2, where the variable belt is shown in cross-section.

A second embodiment of the first linkage 600 is shown in FIGS. 2 and 3 together with an embodiment of the flywheel 700, part of the second linkage 800 and the rotatable drive shaft 150 of the internal combustion engine 100.

In FIG. 2, the belt 625 is omitted whilst in FIG. 3 two parts of the belt 625 are shown in cross section and only at the points where the belt meets the first end 620 and the second end 630.

The second end 630 of the variable belt drive system 610 comprises first and second pulley sheaves 631, 632. A distance between the first and second pulley sheaves 631, 632 is adjustable. The second end 630 of the variable belt drive system 610 comprises an actuator 635 by which the first pulley sheave 631 is moveable towards the second pulley sheave 632 in order to cause the belt 625 to ride up inner surfaces of the respective sheaves 631, 632 so as to adopt a larger radius of rotation of the belt at the second end 630.

Meanwhile, the first end 620 of the variable belt drive system 610 comprises first and second pulley sheaves 621, 622. A distance between the first and second pulley sheaves 621, 622 is adjustable. The first end 620 comprises a spring pack 627 (not shown in FIG. 1) that acts to bias the second pulley sheave back 622 towards the first sheave 621.

In this way, when the actuator 635 at the second end 630 of the variable belt drive system 610 reduces the distance between the first and second pulley sheaves 631, 632 at the second end 630, this causes the belt to adopt a larger radius of rotation at the second end 630. Consequently, at the first end 610, the second pulley sheave 622 is pulled against the bias provided by the spring pack 627 in order increase the distance between the first and second pulley sheaves 621, 622 and thereby cause the belt to adopt a smaller radius of rotation at the first end 620.

Since the belt 625 is of continuous form and fixed diameter, any increase in radius at one end (first or second ends 620, 630) will be accommodated by a corresponding decrease at the other end of the (second or first ends 630, 620) of the variable drive belt system 610, as is known in the art. In this way, by controlling the actuator 635, the ratio of radius at one end relative to the other end may be controlled which in turn controls the relative speed at one end relative to the other end.

A reaction bar 615 is provided to maintain the position of an axis of the first end 620 relative to an axis of rotation of the second end 630 whilst enabling movement of the respective pulley sheaves along their respective axes.

FIGS. 2 and 3 also show an enclosure that houses parts of the supercharger linkage 810, 820 and the second clutch 830.

While FIGS. 2 and 3 are perhaps less schematic than FIG. 1, it should be noted that FIGS. 2 and 3 are schematic and are provided largely to assist in understanding of the operation of the embodiment rather than with the aim of providing precise geometries of and geometrical relationships between the various constituent parts. For the sake of simplicity, not all components are shown in the Figures. For example, FIGS. 2 and 3 omit the first clutch 650 and an additional fixed ratio transmission that may be fitted between the first linkage output 640 and the flywheel input 710.

The engine assembly 10 of the disclosure may be operated in a variety of different modes. Each mode may exploit a different approach to energy recovery from one part or parts of the engine assembly 10 to another part or parts of the engine assembly 10.

Figure 4:
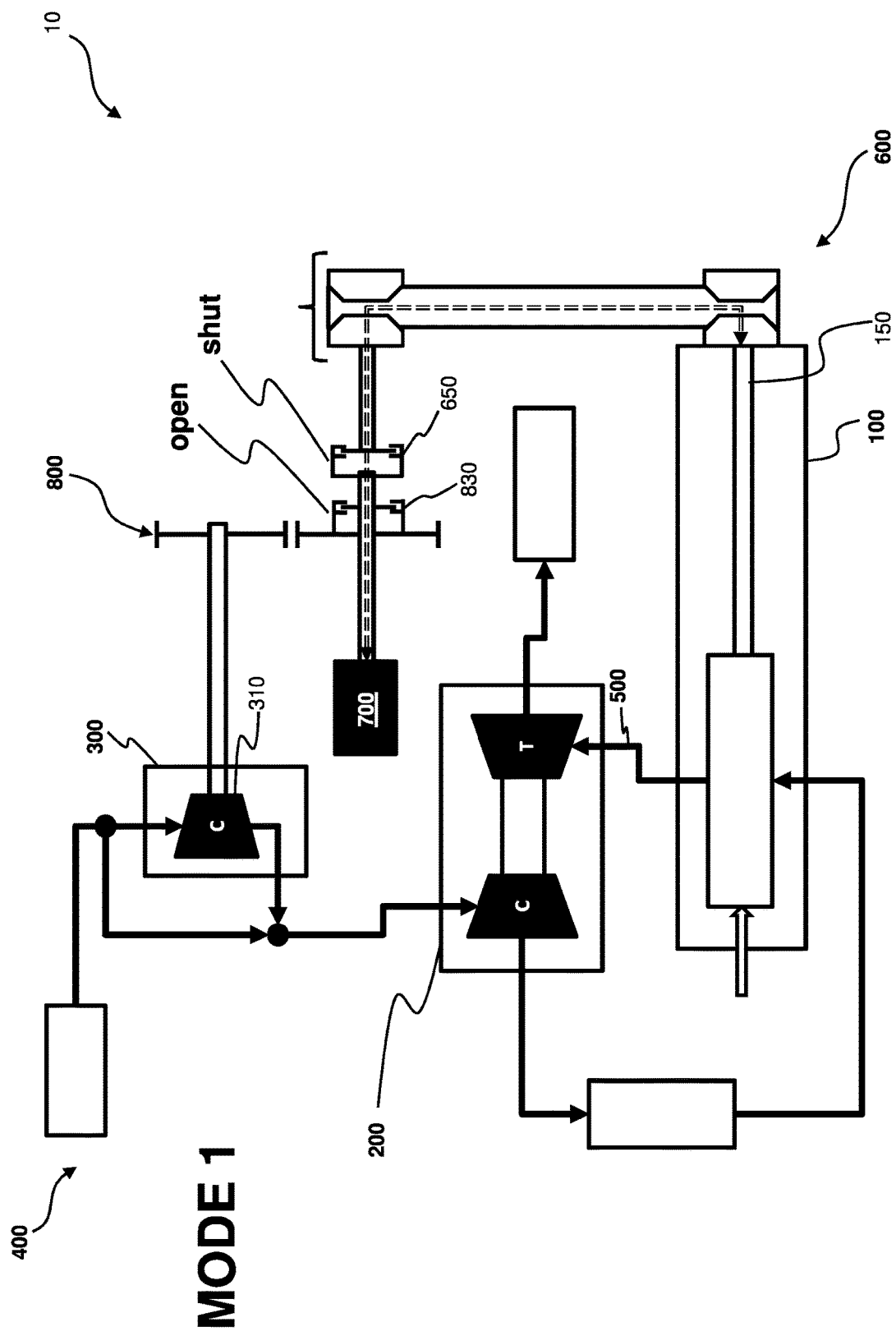
FIG. 4 shows the schematic of FIG. 1 with some reference numerals removed for clarity and showing the direction of energy transfer in a first mode of the engine assembly.

A first mode of the engine assembly is shown in FIG. 4. In this mode:
(a) the first clutch 650 is closed (shut) such that energy may transfer between the first linkage 600 and the flywheel 700, in either direction; and
(b) the second clutch 830 is open such that there is no transfer of energy between the flywheel 700 and the supercharger system 300.

In this way, in the first mode, energy is transferred from the drive shaft 150 of the internal combustion engine 100 to the flywheel 700 for storage or stored energy is transferred from the flywheel 700 to the drive shaft 150 of the internal combustion engine 100. The direction of energy transfer will depend upon the relative speed of the flywheel 700 to the drive shaft 150, as geared via the variable belt drive or by the rate of change of the variable belt drive ratio. However, in the first mode, there is no transfer of energy between the flywheel 700 and the supercharger system 300 in either direction.

Preferably, in the first mode, the bypass loop valve (not shown) is set such that air bypasses the supercharger compressor 310 and travels instead in the bypass loop 430.

The first mode may be appropriate for normal operation of the engine assembly.

Figure 5:
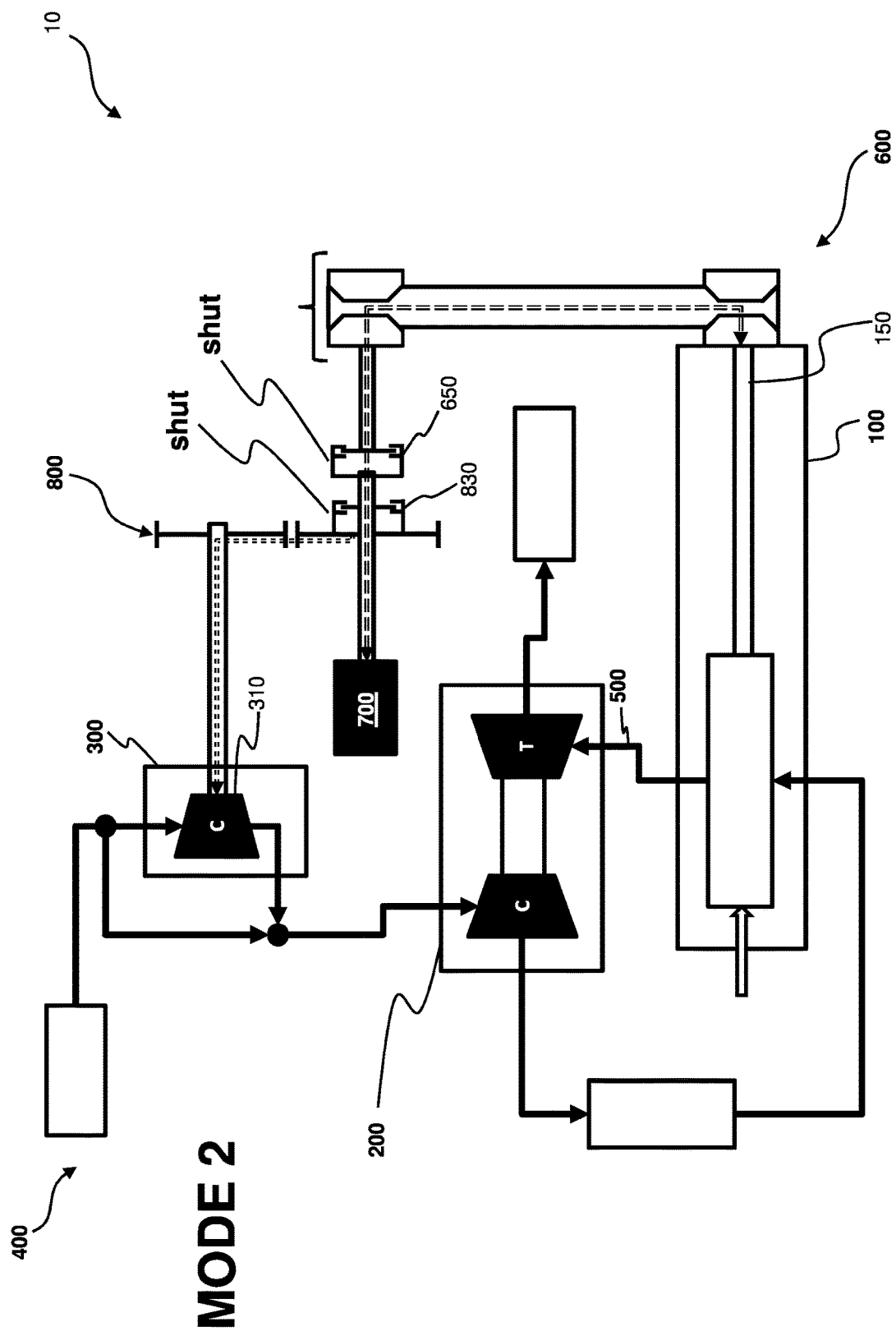
FIG. 5 shows the schematic of FIG. 1 with some reference numerals removed for clarity and showing the direction of energy transfer in a second mode of the engine assembly.

A second mode of the engine assembly is shown in FIG. 5. In this mode:
(a) the first clutch 650 is closed (shut) such that energy may transfer between the first linkage 600 and the flywheel 700, in either direction; and
(b) the second clutch 830 is closed (shut) such that energy may transfer between the flywheel 700 and the supercharger system 300.

In this way, in the second mode, energy is transferred from the drive shaft 150 of the internal combustion engine 100 to the flywheel 700 for storage or stored energy is transferred from the flywheel 700 to the drive shaft 150 of the internal combustion engine 100. The direction of energy transfer will depend upon the relative speed of the flywheel 700 to the drive shaft 150, as geared via the variable belt drive or by the rate of change of the variable belt drive ratio. In addition, energy is transferred from the flywheel 700 to the supercharger system 300 (in that direction only) in order that the compressor 310 of the supercharger system 300 can compress air upstream of the internal combustion engine.

In the second mode, the bypass loop valve (not shown) is set such that at least a portion of air leaving the air cleaner 405 passes through the supercharger compressor 310.

The second mode may be particularly appropriate for operation of the engine at low speed but with high load.

Figure 6:
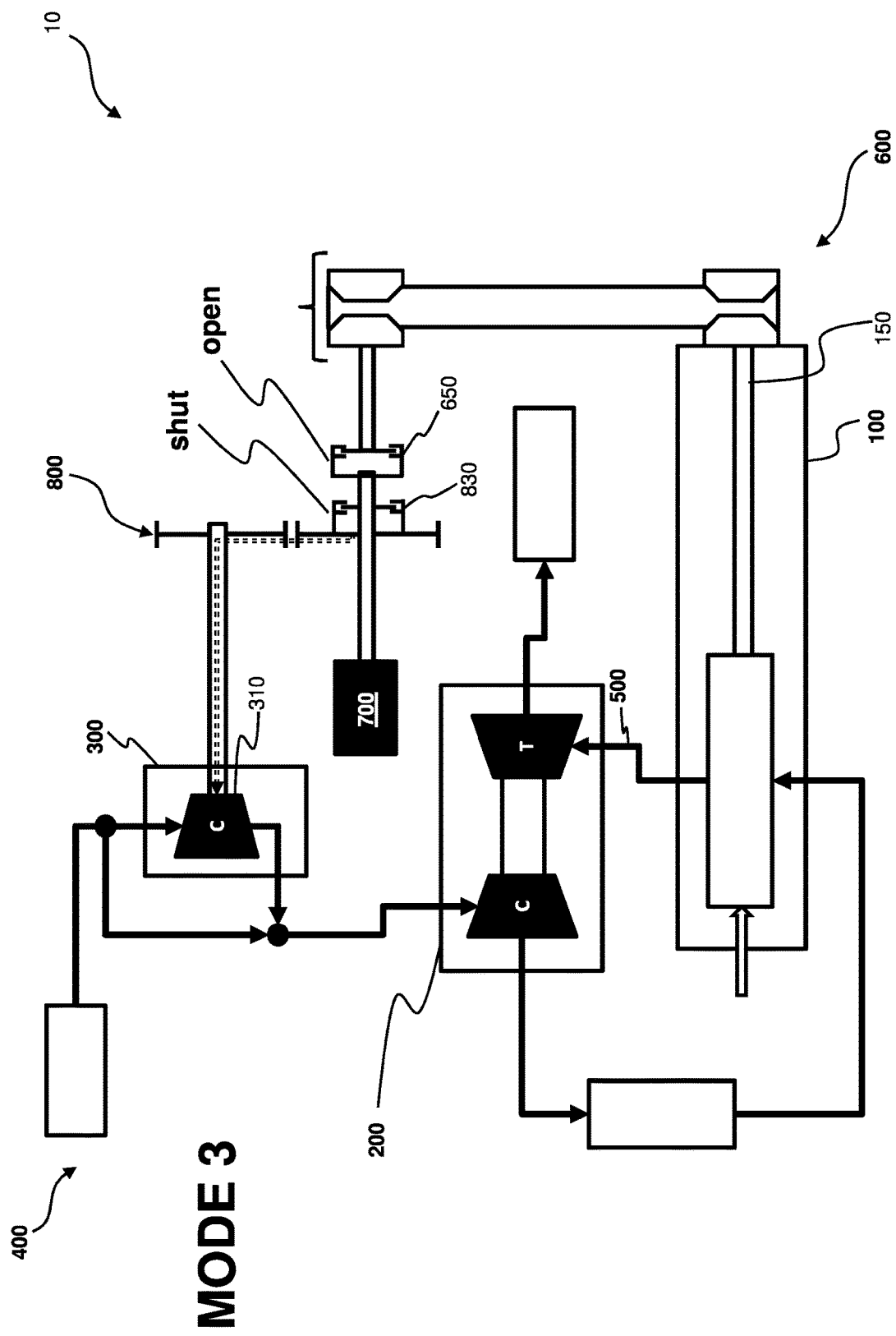
FIG. 6 shows the schematic of FIG. 1 with some reference numerals removed for clarity and showing the direction of energy transfer in a third mode of the engine assembly.

A third mode of the engine assembly is shown in FIG. 6. In this mode:
(a) the first clutch 650 is open such that there is no transfer of energy between the first linkage 600 and the flywheel 700, in either direction; and
(b) the second clutch 830 is closed (shut) such that energy may transfer between the flywheel 700 and the supercharger system 300.

In this way, in the third mode, stored energy is transferred from the flywheel 700 to the supercharger system 300 in order that the compressor 310 of the supercharger system 300 can compress air upstream of the internal combustion engine. However, there is no transfer of energy between the drive shaft 150 of the internal combustion engine 100 and the flywheel 700 in either direction.

In the third mode, the bypass loop valve (not shown) is set such that at least a portion of air leaving the air cleaner 405 passes through the supercharger compressor 310.

The third mode may be particularly appropriate when accelerating from low speed and additional air flow is needed to allow increased fuel combustion to generate increased power levels.

Figure 7:
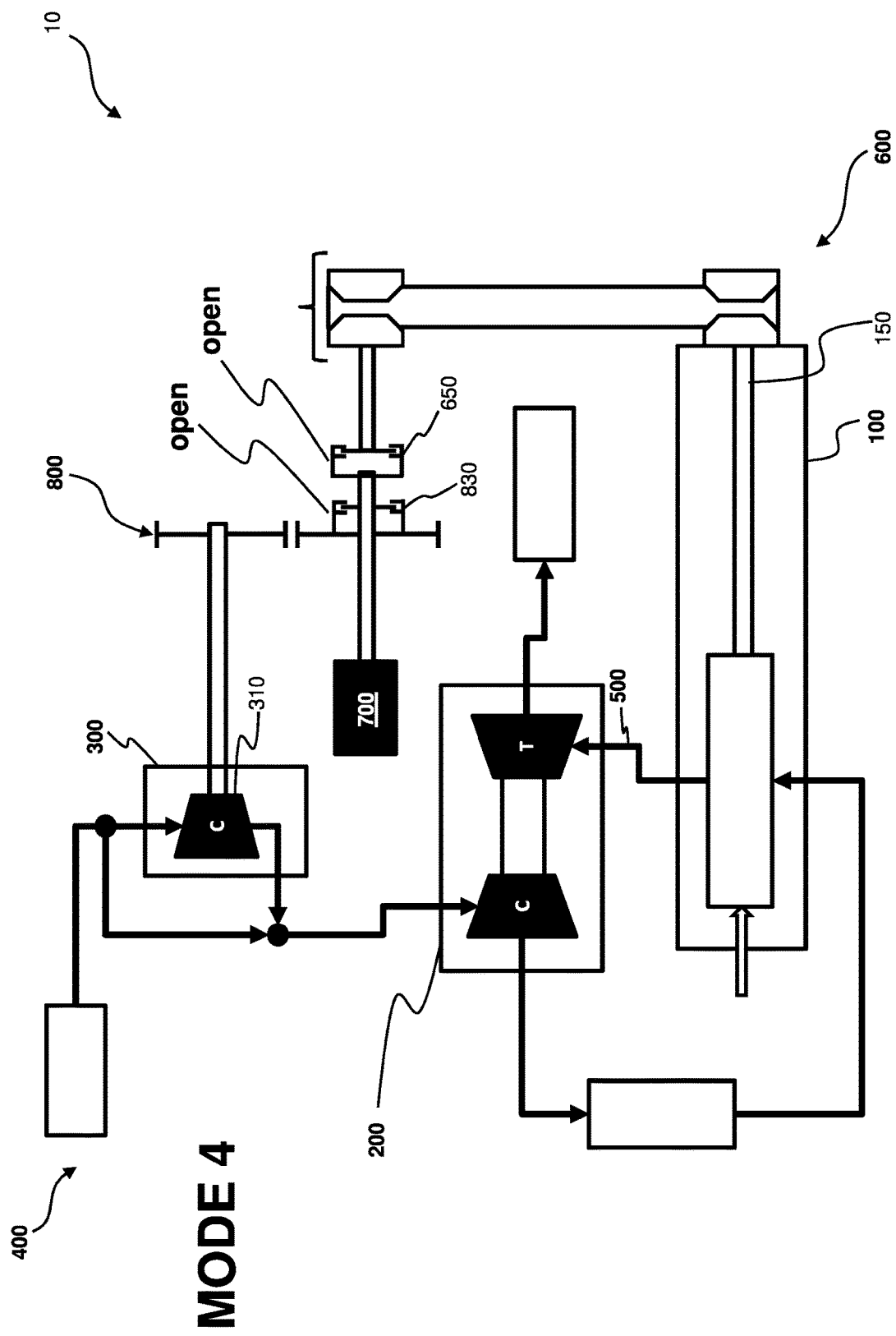
FIG. 7 shows the schematic of FIG. 1 with some reference numerals removed for clarity and in a fourth mode of the engine assembly.

A fourth mode of the engine assembly is shown in FIG. 7. In this mode:
(a) the first clutch 650 is open such that there is no transfer of energy between the first linkage 600 and the flywheel 700, in either direction; and
(b) the second clutch 830 is open such that there is no transfer of energy between the flywheel 700 and the supercharger system 300.

In this way, in the fourth mode, there is no transfer of energy between the drive shaft 150 of the internal combustion engine 100 and the flywheel 700 in either direction and there is no transfer of energy between the flywheel 700 and the supercharger system 300 in either direction. In other words, in this fourth mode, the flywheel 700 is disconnected from the rest of the engine assembly 10.

Preferably, in the fourth mode, the bypass loop valve (not shown) is set such that air bypasses the supercharger compressor 310 and travels instead in the bypass loop 430.

The fourth mode may be particularly appropriate if the flywheel has little or no energy stored. It may be used, for example, when rapid acceleration is called for and there is no desire to divert energy to the flywheel that could be used to achieve that acceleration. It may also be used when initially starting the engine.

INDUSTRIAL APPLICABILITY

By providing a high speed flywheel as an energy storage device, it is possible to recover energy from the drive shaft 150 and store that energy on the flywheel. The stored energy may then be used for either or both of supplying rotational kinetic energy back to the drive shaft 150 and supplying rotational kinetic energy to the supercharger for the purpose of air compression in the regular manner of a supercharger.

In this way, it may be possible to provide an engine having a specification that is capable of providing for the vast majority of tasks but not all and, for the minority of tasks, using energy stored in the flywheel to provide an extra boost to the maximum engine output. This makes it possible to provide a smaller, lower specification engine. This in turn provides advantages including reduced cost, reduced overall package size of the engine, reduced fuel consumption and reduced engine emissions.

The invention claimed is:
1. An engine assembly comprising:
an internal combustion engine having: a combustion chamber; an air inlet for supplying air to the combustion chamber; a fuel injector for supplying fuel to the combustion chamber; an exhaust outlet for releasing exhaust gas from the combustion chamber and a rotatable drive shaft, wherein combustion of fuel in air within the combustion chamber results in rotation of the drive shaft;
a turbocharger system comprising: a turbine configured to recover energy from exhaust gas provided via the exhaust outlet; and a turbocharger compressor config- ured to receive energy from the turbine and thereby to compress air for use in combustion of fuel in the combustion chamber;

a supercharger system comprising a supercharger compressor configured to receive kinetic energy from the drive shaft and to compress air for use in combustion in the combustion chamber;

a flywheel configured for kinetic energy storage;

a first linkage between the drive shaft and the flywheel, wherein the first linkage comprises a variable belt drive; and a second linkage between the flywheel and the supercharger compressor;

wherein the second linkage comprises one or more geared elements and a second clutch, and the entire second linkage is configured to be rotationally disconnected from the first linkage by the second clutch.

2. The engine assembly of claim 1 wherein the first linkage further comprises a fixed ratio mechanical transmission configured to increase rotational speed of the flywheel relative to the variable belt drive.

3. The engine assembly of claim 1 wherein the first linkage comprises a first clutch by which the flywheel is engagable with the variable belt drive when the first clutch is closed and disengageable from the variable belt drive when the first clutch is open.

4. The engine assembly of claim 1, whereby the supercharger system is engagable with the flywheel when the second clutch is closed and disengageable from the flywheel when the second clutch is open.

5. The engine assembly of claim 1 further comprising an exhaust gas circuit for supplying exhaust gas from the exhaust outlet of the internal combustion engine to the turbine of the turbocharger system.

6. The engine assembly of claim 1 further comprising an air inlet circuit for supplying air to the air inlet of the internal combustion engine, wherein the air inlet circuit comprises the supercharger compressor and the turbocharger compressor; and wherein the supercharger compressor is upstream of the turbocharger compressor in the air inlet circuit.

7. The engine assembly of claim 6 wherein the air inlet circuit further comprises a bypass loop including a bypass loop valve by which inlet air can selectively be caused to bypass the supercharger compressor.

8. The engine assembly of claim 1 wherein the one or more geared elements of the second linkage enable a change in speed between a speed of the flywheel and a speed of the supercharger compressor.

9. The engine assembly of claim 1 wherein the turbocharger system comprises a plurality of turbines and the turbocharger system comprises a plurality of turbocharger compressors.

10. The engine assembly of claim 1 wherein the supercharger system comprises a plurality of supercharger compressors.

11. The engine assembly of claim 1 further comprising a controller configured to control modes of the engine assembly.

12. The engine assembly of claim 11 further comprising an air inlet circuit for supplying air to the air inlet of the internal combustion engine, wherein:

the air inlet circuit comprises the supercharger compressor and the turbocharger compressor;

the supercharger compressor is upstream of the turbocharger compressor in the air inlet circuit;

the air inlet circuit further comprises a bypass loop including a bypass loop valve by which inlet air can selectively be caused to bypass the supercharger compressor;

the first linkage comprises a first clutch by which the flywheel is engagable with the variable belt drive when the first clutch is closed and disengageable from the variable belt drive when the first clutch is open; and the second linkage comprises the second clutch whereby the supercharger system is engagable with the flywheel when the second clutch is closed and disengageable from the flywheel when the second clutch is open.

13. The engine assembly of claim 12 wherein in a first mode:

the first clutch is closed such that transfer of energy between the variable belt drive and the flywheel in either direction is enabled; and the second clutch is open and the bypass loop valve is set to open the bypass loop such that the supercharger system is disconnected from the flywheel and from inlet air.

14. The engine assembly of claim 12 wherein in a second mode:

the first clutch is closed such that transfer of energy between the variable belt drive and the flywheel in either direction is enabled; and the second clutch is closed and the bypass loop valve is set to close the bypass loop such that transfer of energy between the drive shaft and the supercharger system is enabled.

15. The engine assembly of claim 12 wherein in a third mode:

the first clutch is open such that transfer of energy between the drive shaft and the flywheel in either direction is prevented; and the second clutch is closed and the bypass loop valve is set to close the bypass loop such that transfer of energy between the flywheel and the supercharger system is enabled.

16. The engine assembly of claim 12 wherein the first clutch is open such that transfer of energy between the drive shaft and the flywheel in either direction is prevented; and the second clutch is open and the bypass loop valve is set to open the bypass loop such that the supercharger system is disconnected from the linkage flywheel and from inlet air.

17. A method of controlling an engine assembly comprising:

providing an internal combustion engine, the internal combustion engine including:

a combustion chamber; an air inlet for supplying air to the combustion chamber; a fuel injector for supplying fuel to the combustion chamber; an exhaust outlet for releasing exhaust gas from the combustion chamber and a rotatable drive shaft, wherein combustion of fuel in air within the combustion chamber results in rotation of the drive shaft;

a turbocharger system comprising: a turbine configured to recover energy from exhaust gas provided via the exhaust outlet; and a turbocharger compressor configured to receive energy from the turbine and thereby to compress air for use in combustion of fuel in the combustion chamber;

a supercharger system comprising a supercharger compressor configured to receive kinetic energy from the drive shaft and to compress air for use in combustion in the combustion chamber;

a flywheel configured for kinetic energy storage;

a first linkage between the drive shaft and the flywheel, wherein the first linkage comprises a variable belt drive;

a second linkage between the flywheel and the supercharger compressor, wherein the second linkage comprises one or more geared elements and a second clutch, and the entire second linkage is configured to be rotationally disconnected from the first linkage by the second clutch; and in an energy storage mode, transferring energy via the first linkage to the flywheel for storage of energy on the flywheel; and in an energy release mode, transferring energy from the flywheel to either or both of:

(a) the drive shaft via the first linkage; and (b) the supercharger system via the second linkage.

18. The method of claim 17 wherein a transition between the energy storage mode and the energy release mode is enabled either (a) by a change in engine speed or (b) by a change in a variable ratio within the first linkage.

* * * * *